United States Patent [19]

Takeuchi

[11] 4,193,487

[45] Mar. 18, 1980

[54] COMBINED NEW OIL VENDING AND WASTE OIL REMOVING APPARATUS

[75] Inventor: Shigeo Takeuchi, Nagoya, Japan

[73] Assignee: Takeuchi Tekko Kabushiki Kaisha, Nagoya, Japan

[21] Appl. No.: 891,489

[22] Filed: Mar. 29, 1978

[30] Foreign Application Priority Data

Oct. 25, 1977 [JP] Japan ............................... 52-127839

[51] Int. Cl.[2] ....................... G07F 15/12; F16N 33/00

[52] U.S. Cl. .................................... 194/9 T; 184/1.5; 194/13

[58] Field of Search .................. 184/1.5; 194/9 T, 13; 222/23, 33, 56, 65, 66, 67, 68, 158

[56] References Cited

U.S. PATENT DOCUMENTS

| | | | |
|---|---|---|---|
| 1,655,939 | 1/1928 | Copeland | 184/1.5 X |
| 1,846,135 | 2/1932 | Mickelson | 194/13 UX |
| 1,925,043 | 8/1933 | Brake | 222/158 X |
| 2,552,749 | 5/1951 | Tabet | 184/1.5 |
| 3,216,527 | 11/1965 | Lewis | 184/1.5 |
| 3,366,276 | 1/1968 | Fridley | 222/66 X |
| 3,726,607 | 4/1973 | Garman | 184/1.5 X |
| 4,095,673 | 1/1978 | Takeuchi | 184/1.5 |

*Primary Examiner*—F. J. Bartuska
*Attorney, Agent, or Firm*—Haseltine, Lake & Waters

[57] ABSTRACT

A combined new oil vending and waste oil removing apparatus designed to automatically remove waste oil from an external oil reservoir and thereafter to feed new oil thereto for selling purposes. The apparatus comprises a waste oil removing device for removing and storing waste oil from an external oil reservoir, a fresh oil feeding device for feeding fresh oil to the external oil reservoir after removal of waste oil, and a control device for controlling the operations of the waste oil removing device and the fresh oil feeding device. With this apparatus, replacement of oil may be carried out readily and automatically without need for giving any consideration to disposal of waste oil as removed.

10 Claims, 6 Drawing Figures

COMBINED NEW OIL VENDING AND WASTE OIL REMOVING APPARATUS

BACKGROUND OF THE INVENTION

1. Field of the Invention

The present invention relates to a combined new oil vending and waste oil removing apparatus, which can automatically remove and store waste oil from an external oil reservoir such as an automobile engine and which can automatically sell new oil.

2. Description of the Prior Art

In the past, when automobile drivers or the like desire to replace used engine oil with new oil, they usually ask a dealer to do so at his gasoline stand or a maintenance and repair shop. In this case, the drivers or the like must pay the dealer for a charge of removing waste oil in addition to a charge of buying new oil, unavoidably resulting in a high cost. Recently, therefore, drivers themselves sometimes purchase new oil at car shops, supermarkets and the like for replacement of engine oil in order to save expenses. However, removing work of waste oil and pouring work of new oil are troublesome, and in addition, the drivers or the like are embarrassed in disposal of the waste oil.

SUMMARY OF THE INVENTION

It is therefore an object of the present invention to provide a combined new oil vending and waste oil removing apparatus in which coins or metal may be inserted into a coin slotter to thereby automatically effect removal of waste oil and feeding of new oil.

DESCRIPTION OF THE PREFERRED EMBODIMENT

Figure 1:
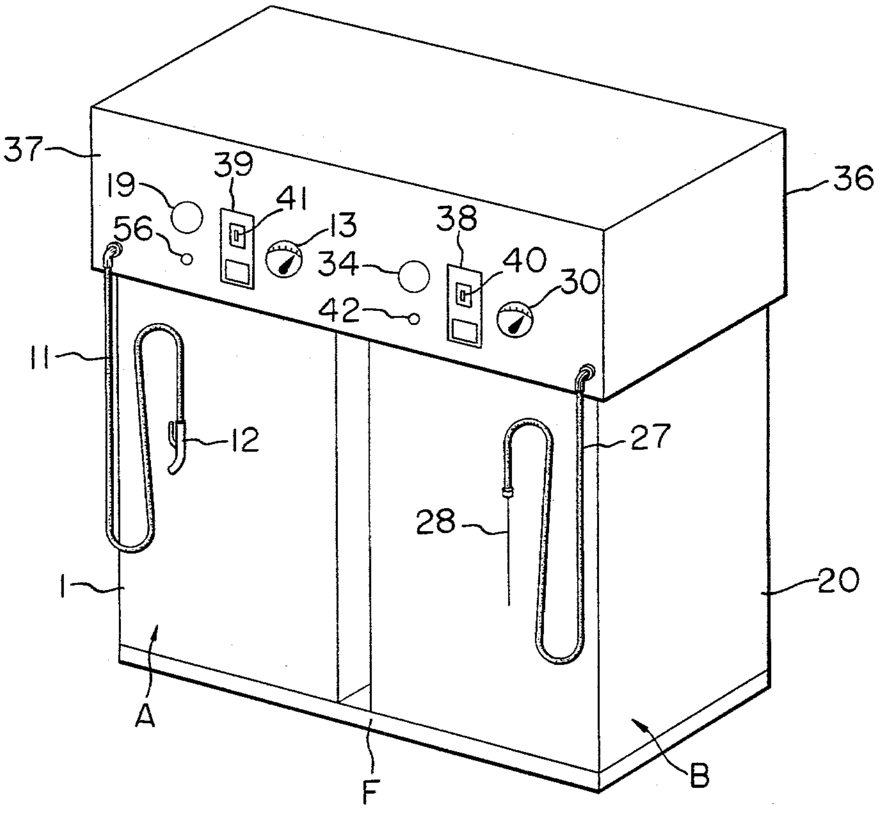
FIG. 1 is a perspective view of a new oil vending and waste oil removing apparatus constructed in accordance with the present invetion.

Referring to the drawings and first to FIG. 1, there is schematically shown a combined oil removing and vending apparatus comprising a fresh oil feeding device A, a waste oil removing device B, both of which are arranged in parallel on a base plate F, and a control device C incorporated in a control box 37 for controlling the operations of these devices A and B.

Figure 2:
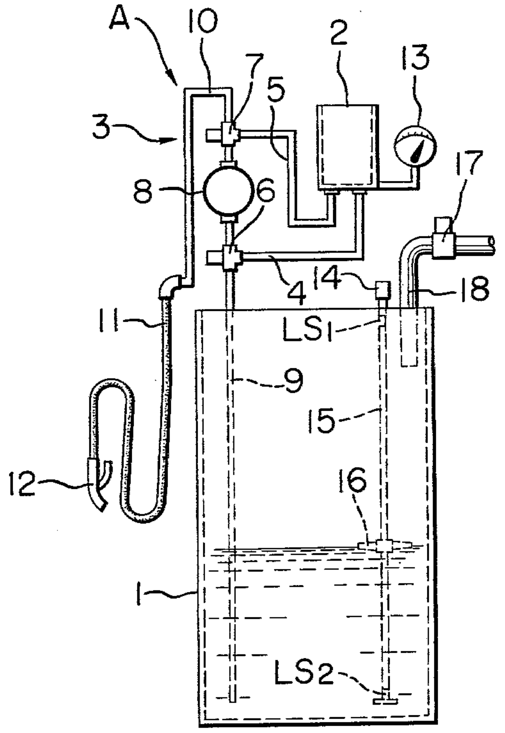
FIG. 2 is a schematic side view of a new oil feeder device of the apparatus.

The fresh oil feeding device A is first described in detail with reference to FIG. 2. The device A includes a box-shaped reservoir 1 for storing fresh oil, a fresh oil metering tank 2 of a relatively limited volume disposed above the fresh oil reservoir 1, and a fresh oil feeding circuit for selectively connecting the tank 2 with the reservoir 1 and an external oil sump (not shown) to be filled with fresh oil. The fresh oil metering tank 2 is connected at its bottom with a lower oil pipe 4 which is in turn connected through a first or lower three-way solenoid valve 6 with a suction pipe 9 extending upwardly from the fresh oil reservoir 1 to a suction side of a constant volume pump 8 with its lower end positioned near the bottom of the reservoir 1. The tank 2 is also connected at its bottom with an upper oil pipe 5 which is in turn connected through a second or upper three-way solenoid valve 7 with a discharge pipe 10 extending from a discharge side of the pump 8 to a flexible hose 11 carrying at its extremity a fresh oil pouring gun 12.

Figure 3A:
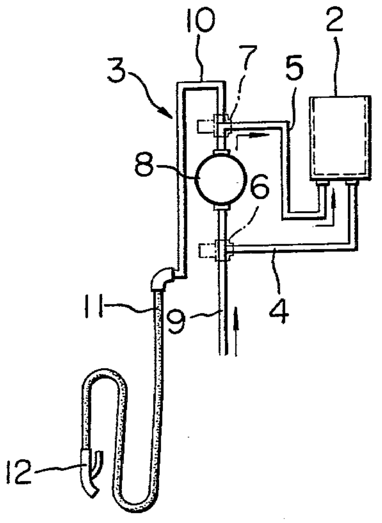
FIGS. 3(*a*) and 3(*b*) show essential parts of the feeder device, respectively indicating flow routes of new oil in new oil feeding operation.
Figure 3B:
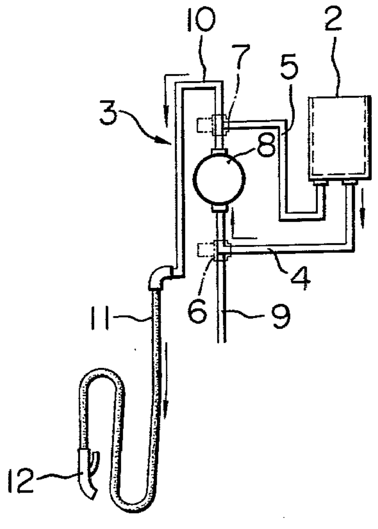

With this arrangement, when the lower and upper three-way solenoid valves 6 and 7 are changed to place the pump 8 into communication with the fresh oil reservoir 1 and the fresh oil metering tank 2, as shown in FIG. 3A, fresh oil in the reservoir 1 is supplied under the drive of the pump 8 to the tank 2 by way of the suction pipe 9, pump 8 and the upper oil pipe 5. On the other hand, when the lower and upper three-way solenoid valves 6 and 7 are changed to place the pump 8 into communication with the tank 2 through the lower oil pipe 4 and with the flexible hose 11 through the discharge pipe 10, as shown in FIG. 3B, fresh oil is fed under the drive of the pump 8 from the tank 2 to the pouring gun 12 by way of the lower oil pipe 4, a portion of the suction pipe 9, pump 8, discharge pipe 10 and flexible hose 11.

The tank 2 is provided with a gage 13 for indicating the quantity of fresh oil contained therein.

Provided in the fresh oil reservoir 1 is a fresh oil level detector 14 for detecting and warning the flooding and shortage of the fresh oil in the reservoir 1. The detector 14 includes a rod portion 15 having an upper and a lower limit switch $LS_1$ and $LS_2$ respectively mounted thereon at locations near the top and bottom surfaces of the reservoir 1, and a float 16 vertically movably mounted on the rod portion 15 between the upper and lower limit switches $LS_1$ and $LS_2$ for actuating these limit switches when the oil level in the reservoir 1 has risen above the upper limit switch $LS_1$ or fallen below the lower limit switch $LS_2$.

A feed pipe 18 for feeding fresh oil connected to the top of the reservoir 1 with a two-way solenoid valve 17 incorporated therein for opening and closing thereof.

Figure 4:
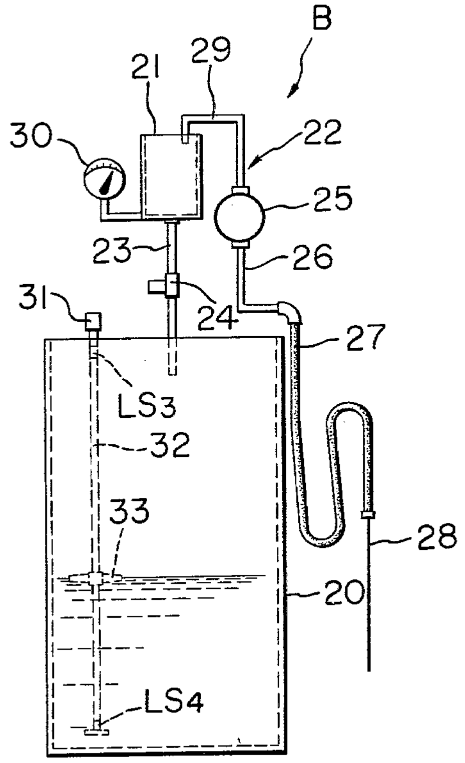
FIG. 4 is a schematic side view of a waste oil removing device of the apparatus.

Now, the waste oil removing device B will be described in detail with reference to FIG. 4. The device B comprises a box-shaped reservoir 20 for storing waste oil removed from an external oil sump (not shown), a waste oil metering tank 21 of a relatively limited volume disposed above the reservoir 20, and a waste oil removing circuit adapted to connect the tank 21 with the reservoir 20 and an external oil sump (not shown) for drawing waste oil from the external oil sump into the tank 21 and thence to the reservoir 20. The waste oil metering tank 21 is connected at its bottom with a waste oil discharge pipe 23 extending downwardly therefrom to the waste oil reservoir 20 with a two-way solenoid valve 24 incorporated therein. The tank 21 is also connected at its top with a discharge side of a constant volume pump 25 through a waste oil pipe 29. The pump 25 is connected at its suction side with a waste oil suction pipe 26 which is in turn connected with a flexible hose 27 carrying at its extremity a waste oil drawing needle 28. The tank 21 is provided with a gage 30 for metering the quantity of waste oil drawn therein.

Provided in the waste oil reservoir 20 is a waste oil level detector 31 for detecting and warning the oil level in the reservoir 20. The detector 31 includes a rod portion 32 having an upper and a lower limit switch $LS_3$ and $LS_4$ respectively mounted thereon at locations near the top and bottom surfaces of the reservoir 20, and a float 33 vertically movably mounted on the rod portion 32 between the limit switches $LS_3$ and $LS_4$ for actuating them when the oil level in the reservoir 20 has risen above the upper limit switch $LS_3$ or fallen below the lower limit switch $LS_4$.

Figure 5:
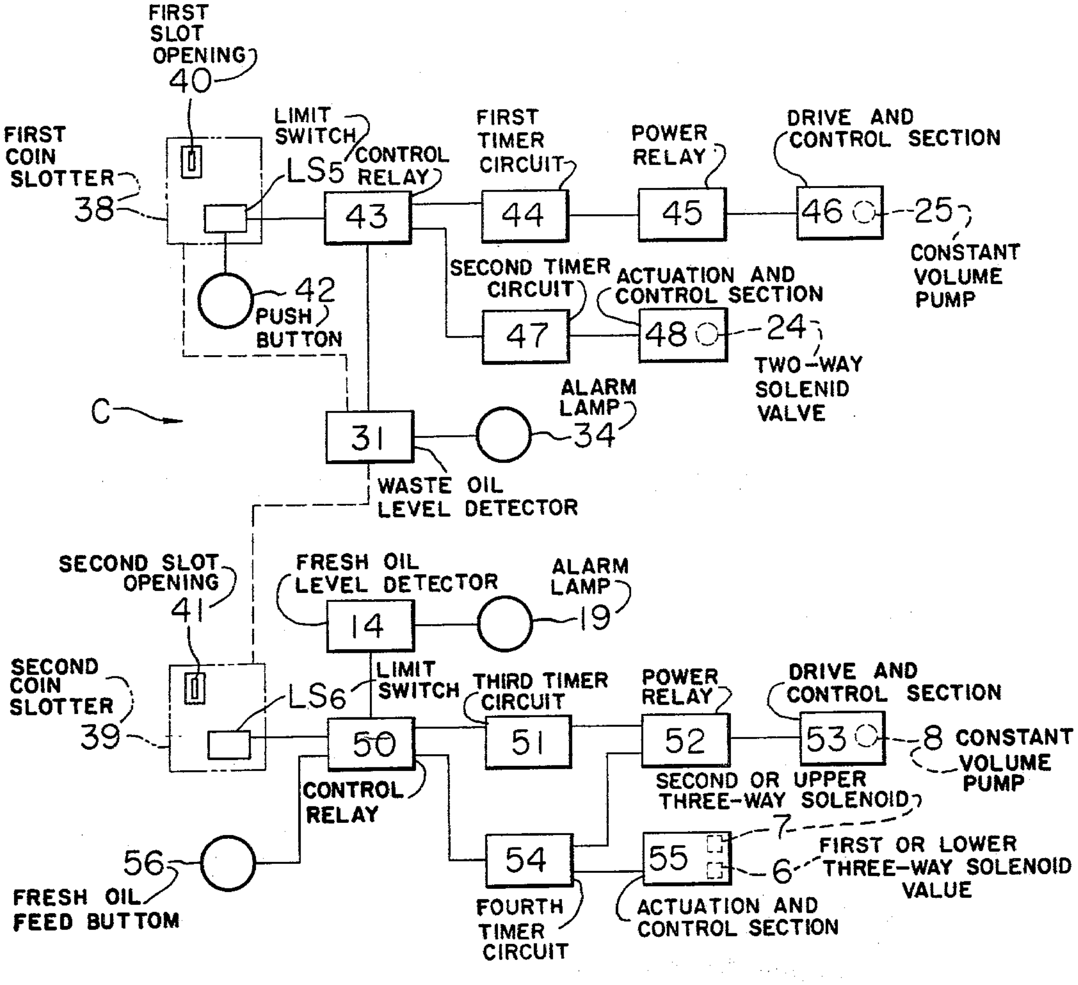
FIG. 5 is a control circuit diagram of a control device for controlling fresh oil feeding and waste oil removing operations of the apparatus.

The control device C for controlling the operations of the fresh oil feeding device A and the waste oil removing device B will be described mainly with reference to FIGS. 1 and 5. The control device C is encased in the control box 36 disposed astride on the tops of the fresh oil feeding device A and of the waste oil removing device B and includes a first and a second control means with a first and a second coin slotter 38 and 39 mounted on a front wall 37 of the control box 36, the first and the second coin slotters respectively having a first and a second slot opening 40 and 41 formed in the respective front outer surfaces thereof.

The first coin slotter 38 is provided with a limit switch $LS_5$ which is actuated by a push button 42 mounted on the front wall 37 of the control box 36 in the vicinity of the slot opening 40. Connected to the limit switch $LS_5$ is a control relay 43 actuatable by an electric signal transmitted therefrom, the control relay 43 being connected to a drive and control section 46 for the waste oil pump 25 through a first timer circuit 44 and a power relay 45, and also to an actuation and control section 48 for the two-way solenoid valve 24 of the waste oil removing device through a second timer circuit 47. Connected further to the control relay 43 is the waste oil level detector 31 which is in turn connected to an alarm lamp 34 mounted on the front wall 37 of the control box 36 in the vicinity of the slot opening 40 so that the lamp 34 is illuminated for warning purposes when the upper limit switch $LS_3$ of the detector 31 is actuated by the float 33.

On the other hand, the second coin slotter 39 is provided with a limit switch $LS_6$, which is actuated by insertion of coins or metals into the slot opening 41. Connected to the limit switch $LS_6$ is a control relay 50 actuatable by an electric signal transmitted therefrom, the control relay 50 being connected to a drive and control section 53 for the fresh oil pump 8 through a third timer circuit 51 and a power relay 52, and also to an actuation and control section 55 for the lower and upper three-way solenoid valves 6 and 7 through a fourth timer circuit 54. A fresh oil feed button 56 mounted on the front wall 37 of the control box 36 is connected to the control relay 50 so that when the button 56 is depressed, the control relay 50 is actuated to generate an electric signal which is transmitted through the third timer circuit 51 and the power relay 52 to the drive and control section 53 for driving the fresh oil pump 8, and at the same time through the fourth timer circuit 54 to the actuation and control section 55 for actuation of the lower and upper three-way solenoid valves 6 and 7. Connected further to the control relay 50 is a fresh oil level detector 14 which is in turn connected to an alarm lamp 19 mounted on the front wall 37 of the control box 36 so that the lamp 19 is illuminated when the lower limit switch $LS_2$ of the detector 14 is actuated by the float 16.

Now, reference is had to the operation of the present apparatus and first to the waste oil removing operation in which waste or used oil is removed from an automotive engine.

By inserting certain pieces of coins or metals into the slot opening 40 of the first coin slotter 38, the waste oil removing device B becomes ready for operation and subsequently when the push button 42 for drawing waste oil is depressed, the limit switch $LS_5$ is operated to apply an electric signal to the control relay 43 to thereby energize the power relay 45 for a certain period of time preset by the timer circuit 44 so that the waste oil pump 25 is driven by the operation of the power relay 45 within the preset time. In this state, the waste oil drawing needle 28 is inserted into an oil reservoir (not shown) of an automobile engine so that used oil in the engine reservoir is drawn into the waste oil metering tank 21 passing through the needle 28, flexible hose 27, pipe 26, pump 25, and waste oil pipe 29. The quantity of the waste oil drawn or removed from the engine reservoir is measured and indicated by the gage 30.

On the other hand, an electric signal generated upon insertion of coins or metals into the slot opening 40 is also transmitted to the actuation and control section 48 by way of the control relay 43 and the second timer circuit 47 to close the two-way solenoid valve 24. Subsequently, at the instant when the time set by the second timer circuit 47 is up, the two-way solenoid valve 24 is opened to permit the waste oil previously drawn into the waste oil metering tank 21 to flow down under gravity into the waste oil reservoir 20 for storage.

After the waste oil within the engine reservoir has been removed, certain pieces of coins or metals, sufficient for the purchase of new oil in an amount corresponding to the removed quantity of waste oil as indicated by the gage 30, are inserted into the slot opening 41 of the second coin slotter 39 to energize the limit switch $LS_6$ thereby to produce an electric signal, which is transmitted through the control relay 50 and the third timer circuit 51 to the power relay 52 to actuate it for a period of time set by the third timer circuit 51. Thereafter, the drive and control section 53 is actuated by the energization of the power relay 52 to drive the pump 8 so that fresh oil previously drawn therein from the fresh oil reservoir 1 through the suction pipe 9 is fed under pressure into the fresh oil metering tank 2 through the oil pipe 5, as indicated by arrows in FIG. 3A. The quantity of fresh oil drawn into the tank 2 is measured and indicated by the gage 13.

When the new oil feed button 56 is depressed after the fresh oil metering tank 2 has been filled with a definite quantity of fresh oil, the control relay 50 is actuated to generate an electric signal which is transmitted therefrom to the fourth timer circuit 54. The electric signal is further transmitted from the fourth timer circuit 54 on one hand to the drive and control section 53 through the power relay 52 to again drive the constant volume pump 8 and on the other hand to the actuation and control section 55 to change over the lower and upper three-way solenoid valves 6 and 7, whereby the fresh oil in the fresh oil metering tank 2 is fed under the action of the pump 8 to the pouring gun 12 via the lower oil pipe 4, pump 8, discharge pipe 10 and flexible hose 11, as clearly shown by arrows in FIG. 3B. At this state, the pouring gun 12 may be inserted into an inlet of the engine reservoir, as previously emptied, and then triggered to feed fresh oil into the engine reservoir at the definite quantity as indicated by the gage 1.

In this manner, replacement of waste oil with fresh oil in the engine reservoir can be performed in a continuous and automatic fashion.

Incidentally, it is to be noted that the oil levels in the waste oil reservoir 20 and the fresh oil reservoir 1 may be checked in the following procedure. When the waste oil tank 20 is filled with waste or used oil, the float comes into contact with the upper limit switch $LS_3$ of the waste oil level detector 31 so that the limit switch $LS_3$ is closed to illuminate the associated alarm lamp 34 for warning to the exterior of the fact that the reservoir 2 has fully filled with waste oil. Simultaneously, upon closure of the upper limit switch $LS_3$, an electrical signal is imposed by the limit switch $LS_3$ on the first control relay 43 so that the relay 43 operates to prevent the waste oil removing device B from being actuated even if coins or metals are inserted into the slot opening 40 of the second coin slotter 38.

On the other hand, when the fresh oil reservoir 1 is emptied, the float 16 of the fresh oil level detector 14 comes into contact with the lower limit switch $LS_2$ so that the limit switch $LS_2$ is closed to illuminate the alarm lamp 19 for the purpose of warning to the exterior of the shortage of fresh oil within the fresh oil reservoir 1. Simultaneously with the closure of the lower limit switch $LS_2$, an electric signal is imposed by the limit switch $LS_2$ on the control relay 50 to prevent the fresh oil feeding device A from being operated even if coins or metals are inserted into the slot opening 41 of the first coin slotter 39. In addition, when the fresh oil reservoir 1 has fully fed with fresh oil, the float 16 comes into contact with the upper limit switch $LS_1$ of the fresh oil level detector 14 so that the limit switch $LS_1$ is actuated to close the two-way solenoid valve 17 incorporated in the fresh oil feed pipe 18, thereby blocking the supply of fresh oil into the fresh oil reservoir 1.

Moreover, it is to be noted that due to the fact the apparatus of the present invention is generally installed outdoors and often used for self-service sales of new oil, a special consideration has been given in order to prevent coins inserted and accumulated in the apparatus from being stolen. To this end, the apparatus is designed such that a special master key can be used to open the first and second coin slotters 38 and 39 for taking out the coins therein only when the waste oil stored in the waste oil reservoir 20 has been emptied. Accordingly, in this design, when waste oil has been removed from the waste oil reservoir 20 to allow the float 33 to come into contact with the lower limit switch $LS_4$, the limit switch $LS_4$ is actuated to impose an electric signal on the first and second coin slotters 38 and 39 so that covers for these slotters can be opened by the master key, but as long as waste oil in the waste oil reservoir 20 is above a certain minimum level and hence the float 33 is held out of contact with the lower limit switch $LS_4$, the covers can never be opened even by the master key.

To summarize, in the apparatus of the present invention, simply by inserting coins or metals into first and second coin slotters, it is possible to remove waste oil from an external oil reservoir such as, for example, an engine oil reservoir into a waste oil reservoir of the apparatus for storage purposes and then to feed fresh oil to the external oil reservoir in an automatic fashion and thus replacement of waste oil with new oil can be made readily without having to give any special consideration for disposal of waste oil removed.

While only a presently preferred, exemplary embodiment of the present invention has been shown and described, it will be apparent to those skilled in the art that various changes and modifications may be made therein without departing from the scope of the invention as defined in the appended claims.

What is claimed is:

1. A combined new oil vending and waste oil removing apparatus comprising:

a waste oil removing device having a waste oil reservoir for storage of waste oil, a waste oil metering tank for metering the quantity of waste oil to be removed from an external oil reservoir, and a waste oil removing circuit for removing waste oil from said external oil reservoir into said waste oil reservoir;

a fresh oil feeding device having a fresh oil reservoir for storage of fresh oil, a fresh oil metering tank for metering the quantity of fresh oil to be fed therefrom to said external oil reservoir, and a fresh oil feeding circuit for feeding fresh oil from said fresh oil reservoir to said external oil reservoir;

a control device for controlling the operations of said waste oil removing device and said fresh oil feeding device, said control device including a first control means with a first coin slotter for controlling the operation of said fresh oil feeding device, and a second control means with a second coin slotter for controlling the operation of said waste oil removing device;

a feed pipe connected to said fresh oil reservoir for supplying fresh oil, and a two-way changeover valve included in said feed pipe for the opening and closing thereof;

a fresh oil level detector in said fresh oil reservoir, said detector including a rod portion vertically disposed in said fresh oil reservoir, a pair of first and second limit switches mounted on said rod portion, and a float member fitted over said rod portion for vertical sliding movement therealong, whereby when the oil level in said fresh oil reservoir rises above an upper limit, said first limit switch is actuated by said float member to change over said two-way valve for closure of said feed pipe, whereas when the oil level in said fresh oil reservoir falls below a lower limit, said second limit switch is acutated by said float member to produce an alarm signal for warning to the exterior of the shortage of fresh oil within said fresh oil reservoir.

2. An apparatus according to claim 1, wherein said fresh oil feeding circuit comprises a fresh oil pump of constant volume type having a suction side and a discharge side, a suction pipe extending from said suction side of said fresh oil pump into the interior of said fresh oil reservoir, a first three-way changeover valve incorporated in said suction pipe and connected to said fresh oil metering tank, said first valve being operable to selectively place said first pump into communication with said fresh oil reservoir and said fresh oil metering pump, respectively, a pouring gun adapted to be insertable into said external oil reservoir, a discharge pipe leading from said discharge side of said fresh oil pump to said pouring gun, and a second three-way changeover valve incorporated in said discharge pipe and connected to said fresh oil metering tank, said second valve being operable to selectively place said first pump into communication with said fresh oil metering pump and said pouring gun, respectively.

3. An apparatus according to claim 2, wherein said first and second valves each comprises a three-way solenoid valve.

4. An apparatus according to claim 1, wherein said fresh oil metering tank is provided with a gage for measuring and indicating the quantity of fresh oil contained therein.

5. An apparatus according to claim 1, wherein said two-way valve in said feed pipe comprises a two-way solenoid valve.

6. An apparatus according to claim 1, wherein said waste oil removing circuit comprises a discharge pipe extending from said waste oil metering tank to said waste oil reservoir, a two-way changeover valve incorporated in said discharge pipe for opening and closing thereof, and a waste oil pump of constant volume type connected at its discharge side to said waste oil metering tank and at its suction side to a drawing needle adapted to be insertable into said external oil reservoir.

7. An apparatus according to claim 1, wherein said waste oil metering tank is provided with a gage for measuring and indicating the quantity of waste oil contained therein.

8. A combined new oil vending and waste oil removing apparatus comprising:

a waste oil removing device having a waste oil reservoir for storage of waste oil, a waste oil metering tank for metering the quantity of waste oil to be removed from an external oil reservoir, and a waste oil removing circuit for removing waste oil from said external oil reservoir into said waste oil reservoir;

a fresh oil feeding device having a fresh oil reservoir for storage of fresh oil, a fresh oil metering tank for metering the quantity of fresh oil to be fed therefrom to said external oil reservoir, and a fresh oil feeding circuit for feeding fresh oil from said fresh oil reservoir to said external oil reservoir;

a control device for controlling the operations of said waste oil removing device and said fresh oil feeding device, said control device including a first control means with a first coin slotter for controlling the operation of said fresh oil feeding device, and a second control means with a second coin slotter for controlling the operation of said waste oil removing device;

said waste oil removing circuit comprises a discharge pipe extending from said waste oil metering tank to said waste oil reservoir, a two-way changeover valve included in said discharge pipe for opening and closing thereof, and a waste oil pump of constant volume type connected at its discharge side to said waste oil metering tank and at its suction side to a drawing needle adapted to be insertable into said external oil reservoir;

a waste oil lever detector in said waste oil reservoir, said detector including a rod portion disposed vertically in said waste oil reservoir, a pair of first and second limit switches mounted on said rod portion, and a float member fitted over said rod portion for sliding movement therealong, whereby when the oil lever in said waste oil reservoir rises above an upper limit or falls below a lower limit, said first or second limit switch is actuated by said float member to produce an alarm signal for warning purposes.

9. A combined new oil vending and waste oil removing apparatus comprising:

a waste oil removing device having a waste oil reservoir for storage of waste oil, a waste oil metering tank for metering the quantity of waste oil to be removed from an external oil reservoir, and a waste oil removing circuit for removing waste oil from said external oil reservoir into said waste oil reservoir;

a fresh oil feeding device having a fresh oil reservoir for storage of fresh oil, a fresh oil metering tank for metering the quantity of fresh oil to be fed therefrom to said external oil reservoir, and a fresh oil feeding circuit for feeding fresh oil from said fresh oil reservoir to said external oil reservoir;

a control device for controlling the operations of said waste oil removing device and said fresh oil feeding device, said control device including a first control means with a first coin slotter for controlling the operation of said waste oil feeding device, and a second control means with a second coin slotter for controlling the operation of said fresh oil removing device;

said first control means comprising a waste oil removing switch, a limit switch arranged in said first coin slotter and connected to said waste oil removing switch, a first control relay connected to said limit switch, a first drive and control section connected to said first control relay by way of a first timer circuit and a first power relay for controlling the operation of said waste oil removing device, a two-way changeover valve; a first actuation and control section connected to said first control relay through a second timer circuit for controlling the operation of said two-way changeover valve included in said discharge pipe extending between said waste oil metering tank and said waste oil reservoir, the arrangement being such that said limit switch is operated upon actuation of said waste oil drawing to apply an electric signal onto said first control relay which is then operated to energize on the one hand said first power relay and hence said first drive and control section for driving said waste oil removing device for a period of time preset by said first timer circuit, and on the other hand said first actuation and control section for opening said two-way valve after a lapse of a time interval preset by said second timer circuit.

10. A combined new oil vending and waste oil removing apparatus comprising:

a waste oil removing device having a waste oil reservoir for storage of waste oil, a waste oil metering tank for metering the quantity of waste oil to be removed from an external oil reservoir, and a waste oil removing circuit for removing waste oil from said external oil reservoir into said waste oil reservoir;

a fresh oil feeding device having a fresh oil reservoir for storage of fresh oil, a fresh oil metering tank for metering the quantity of fresh oil to be fed therefrom to said external oil reservoir, and a fresh oil feeding circuit for feeding fresh oil from said fresh oil reservoir to said external oil reservoir;

a control device for controlling the operations of said waste oil removing device and said fresh oil feeding device, said control device including a first control means with a first coin slotter for controlling the operation of said waste oil feeding device, and a second control means with a second coin slotter for controlling the operation of said fresh oil removing device;

said second control means comprising a limit switch arranged in said second coin slotter, a control relay connected to said limit switch and a fresh oil feed switch, a drive and control section connected to said control relay by way of a first timer circuit and a power relay for controlling the operation of said fresh oil feeding device, said power relay being connected to said fresh oil feed switch through a second timer circuit and said control relay, and an actuation and control section connected to said fresh oil feed switch through said second timer circuit and said control relay, first and second three-way changeover valves the arrangement being such that said limit switch is actuated upon insertion of coins into said second coin slotter to apply an electric signal onto said control relay which is then operated to energize said power relay and hence said drive and control section for a period of time set by said first timer circuit to thereby drive said fresh oil feeding device, and that when said fresh oil feed switch is actuated, said control relay is energized by an electric signal transmitted from said new oil feed switch to actuate through said second timer circuit both said acutation and control section for changing said first and second three-way changeover valves, and said power relay and hence said drive and control section for driving said fresh oil pump for a period of time preset by said second timer circuit.

* * * * *